(12) United States Patent
Zhang

(10) Patent No.: US 6,793,691 B2
(45) Date of Patent: Sep. 21, 2004

(54) METHOD FOR ASSEMBLING BATTERY ELEMENT GROUP AND BATTERY MANUFACTURED WITH THE SAME METHOD

(75) Inventor: Huanong Zhang, Hubei (CN)

(73) Assignee: Xiongtao Power Supply Technology Co., Ltd., Shenzhen (CN)

(*) Notice: Subject to any disclaimer, the term of this patent is extended or adjusted under 35 U.S.C. 154(b) by 128 days.

(21) Appl. No.: 10/037,304

(22) Filed: Dec. 31, 2001

(65) Prior Publication Data

US 2002/0108234 A1 Aug. 15, 2002

(30) Foreign Application Priority Data

Jan. 3, 2001 (CN) .......................................... 01107409 A
May 8, 2001 (CN) .......................................... 01117743 A

(51) Int. Cl.[7] ............................ H01M 6/00; B23P 13/00
(52) U.S. Cl. .............................. 29/623.1; 29/2; 29/623.3
(58) Field of Search ............................. 29/623.1, 623.3, 29/2; 429/209, 241, 243

(56) References Cited

U.S. PATENT DOCUMENTS 3,663,721 A  * 5/1972   Blondel et al. ............. 429/131
4,761,352 A  * 8/1988   Bakos et al. ................ 429/94
5,468,569 A  * 11/1995  Pyszczek et al. ........... 429/94

* cited by examiner

Primary Examiner—Raymond Alejandro
(74) Attorney, Agent, or Firm—Westman, Champlin & Kelly, P.A.

(57) ABSTRACT

A method for assembling battery element group includes the steps of folding the plates, arranging the positive and negative plates alternately, inserting a plate with one of the polarities into a laminated area of the plate with the other polarity, and providing a separator between the positive and negative plates. This invention improves the producing efficiency, decreases the waste products, and the plates can be integrated and connected with the bar reliably, thus decreases the resistance and increases the high current discharge performance.

6 Claims, 17 Drawing Sheets

METHOD FOR ASSEMBLING BATTERY ELEMENT GROUP AND BATTERY MANUFACTURED WITH THE SAME METHOD

The present application is based on and claims the benefit of China patent application Serial. No. 01107409.4, filed Jan. 3, 2001 and China patent application Serial. No. 01117743.8, filed May 8, 2001, the contents of which are hereby incorporated by reference in their entirety.

FIELD OF THE INVENTION

This invention relates to a method for assembling a battery element group, and more specifically to a method for assembling the element group of storage batteries and battery products thereof.

DESCRIPTION OF THE RELATED ART

A conventional battery includes a closed space surrounded by the case of the battery. The battery element group is provided in the closed space and a battery post or terminal pass through the case. One end of the terminal inside the case is connected to the bar of the element group. The battery element group comprises positive plates, negative plates and separators. Positive plates and negative plates are stacked at intervals. A separator is sandwiched between a positive plate and a negative plate. The plate lugs with the same polarity are connected to the bar with corresponding polarity. In generally, since plate lugs and the bar are connected by welding, the resistance between lugs and the bar increases due to defects in welding and it has disadvantageous influence on battery high current discharge performance. Positive and negative plates are assembled as required, i.e., the positive and negative electrode plates are overlapped alternately, and insulated with separators. Then plates with the same polarity are connected together by welding. In order to increase the efficiency, the grids are cast in the form of multi-grid panel. Active material is then pasted on the grid panel. The pasted grid panel is processed under a certain temperature and humidity condition, thus the active material is hardened and fastened to the grid. After that, the cured plate panel is dried for proper time. The positive and negative plates are connected to a DC power supply for formation. The active material component of the positive plate is oxidized and then changed into the discharge material of the positive plate. Similarly, the active material component of the negative plate is reduced and then changed into the discharge material of the negative plate. After the above-described processes, the formed plate panel is cut into individual plate and then assembled. The efficiency of cutting the plate panel into individual plate is low, and waste products are likely to be made.

SUMMARY OF THE INVENTION

The present invention has been made to overcome the above-mentioned shortcoming.

It is therefore an object of this invention to provide a method for assembling the battery element group which is capable of eliminating the drawbacks of plates with same polarity being welded by conventional method, decreasing the resistance so as to increase the discharge performance and improving the production efficiency.

It is another object of this invention to provide a battery manufactured with the method of this invention which is capable of eliminating the drawbacks of plates with same polarity being welded by conventional method, decreasing the resistance so as to increase the discharge performance and improving production efficiency.

In accordance with a first aspect of the present invention, there is provided a method for assembling a battery element group, comprises the steps of folding the plates, arranging the positive and negative plates alternately, inserting a plate with one of polarity into a laminated area of the plate with the other polarity, and providing a separator between the positive and negative plates.

In accordance with a second aspect of the present invention, there is provided a battery comprises a case, posts having one end placed outside the case, the other end being inside the case and connected to the bar of the battery element group, the plate being placed in the space of case being in the shape of folding, the positive and negative plates being arranged alternately, the plate with one of polarity being inserted into the laminated area of the plate with the other polarity, and a separator being provided between the positive and negative plates.

This invention achieves the advantages, which it is not necessarily to cut the plate panel, thereby improving the efficiency and decreasing the waste products. Further, The plates can be integrated and connected with the bar reliably. Furthermore, the present invention eliminates the poor connection between plates with the same polarity, thus decreases the resistance and increases the high current discharge performance.

In a preferred embodiment, a plate with one of the polarities can be folded into a continuous S-shape along with a separator integrally, another electrode plate with the other polarity is inserted in the laminated area of that electrode plate.

DESCRIPTION OF FIGURES

Other features and advantages of the invention will appear through the description of the non-restrictive embodiments of the invention, described in reference to the enclosed drawings.

MODE FOR CARRYING OUT THE INVENTION

Preferred embodiments of this invention will be described bellow with reference to figures.

Figure 6:
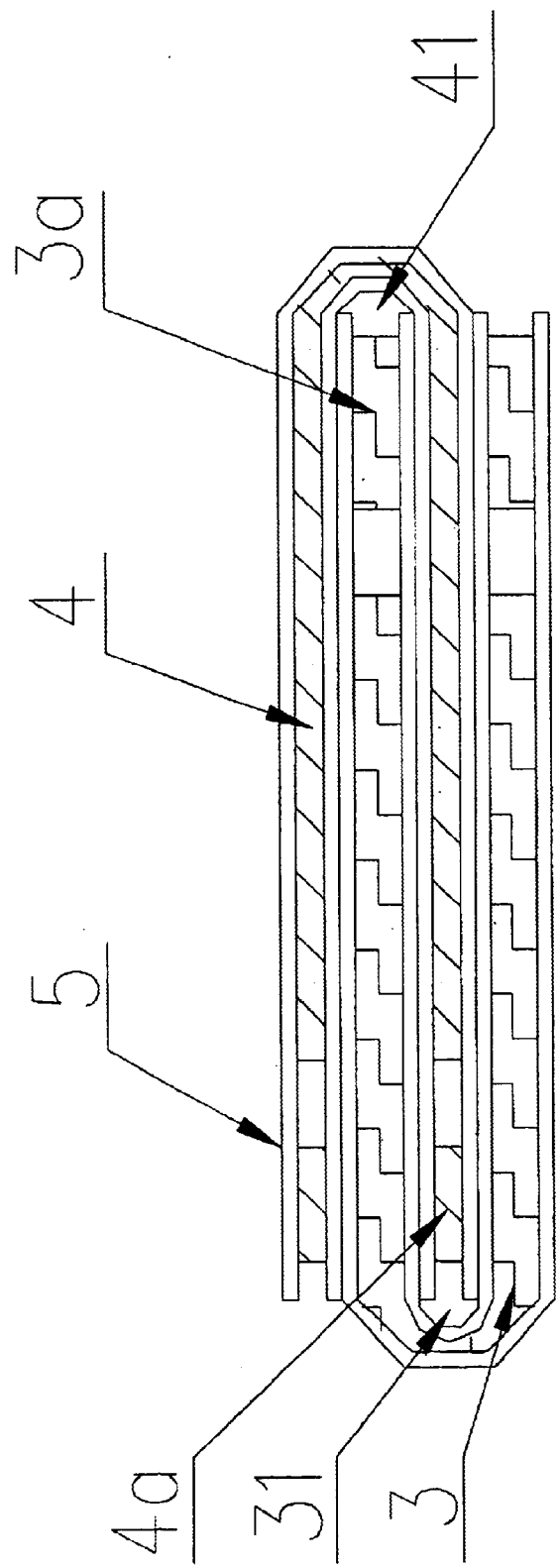
FIG. 6 is a schematic diagram showing one of the configurations of U-shape plate according to a preferred embodiment of the present invention.
Figure 7:
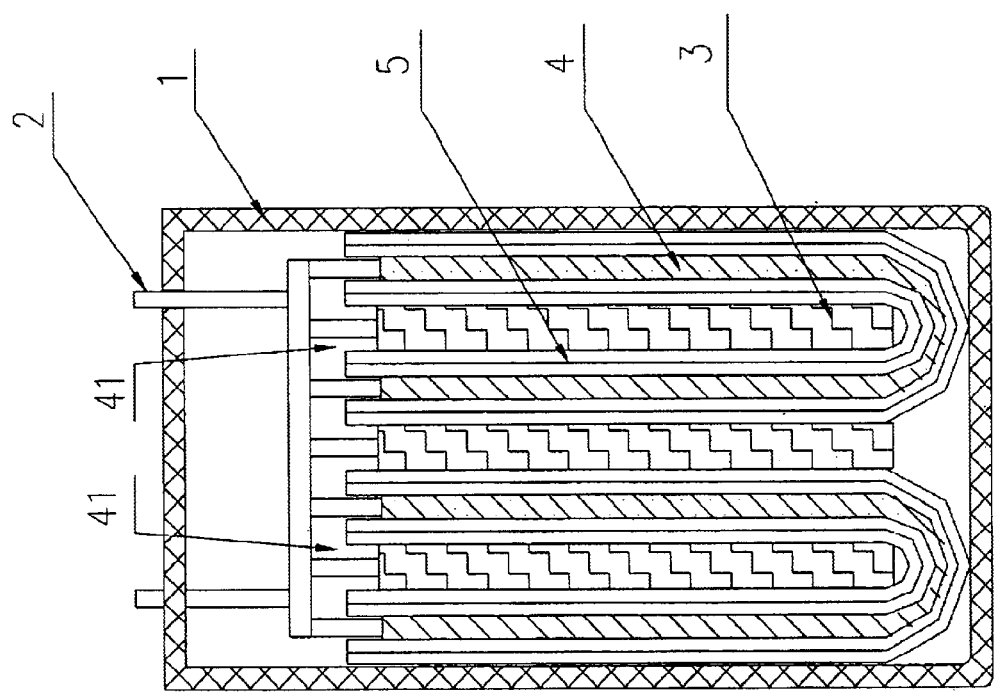
FIG. 7 is a schematic diagram showing another configuration of U-shape plate according to a preferred embodiment of the present invention.

There is provided a method for assembling a battery element group, the plates are folded, positive and negative plates are arranged alternatively, a plate with one of the polarities is inserted into the laminated area of an plate with the other polarity. A separator is provided between the positive and negative plates. As shown in FIG. 7, a negative plate 4 is folded into U-shape, a positive plate 3 is inserted into the laminated area 41 of the negative plate 4, and a separator 5 is provided between the positive plate 3 and the negative plate 4. As shown in FIG. 6, the positive plate 3 and the negative plate 4 are folding plates, both of them are inserted into each other in opposite direction. The positive plate 3 exhibits a folding shape in U-shape, and the negative plate 4 has the same shape as that of the positive plate 3. One side 3a of the positive plate 3 is positioned in the laminated area 41 of the negative plate 4, one side 4a of the negative plate 4 is positioned in the laminated area 31 of the positive plate 3, while the separator 5 is provided between the positive 3 and the negative plate 4.

Figure 4:
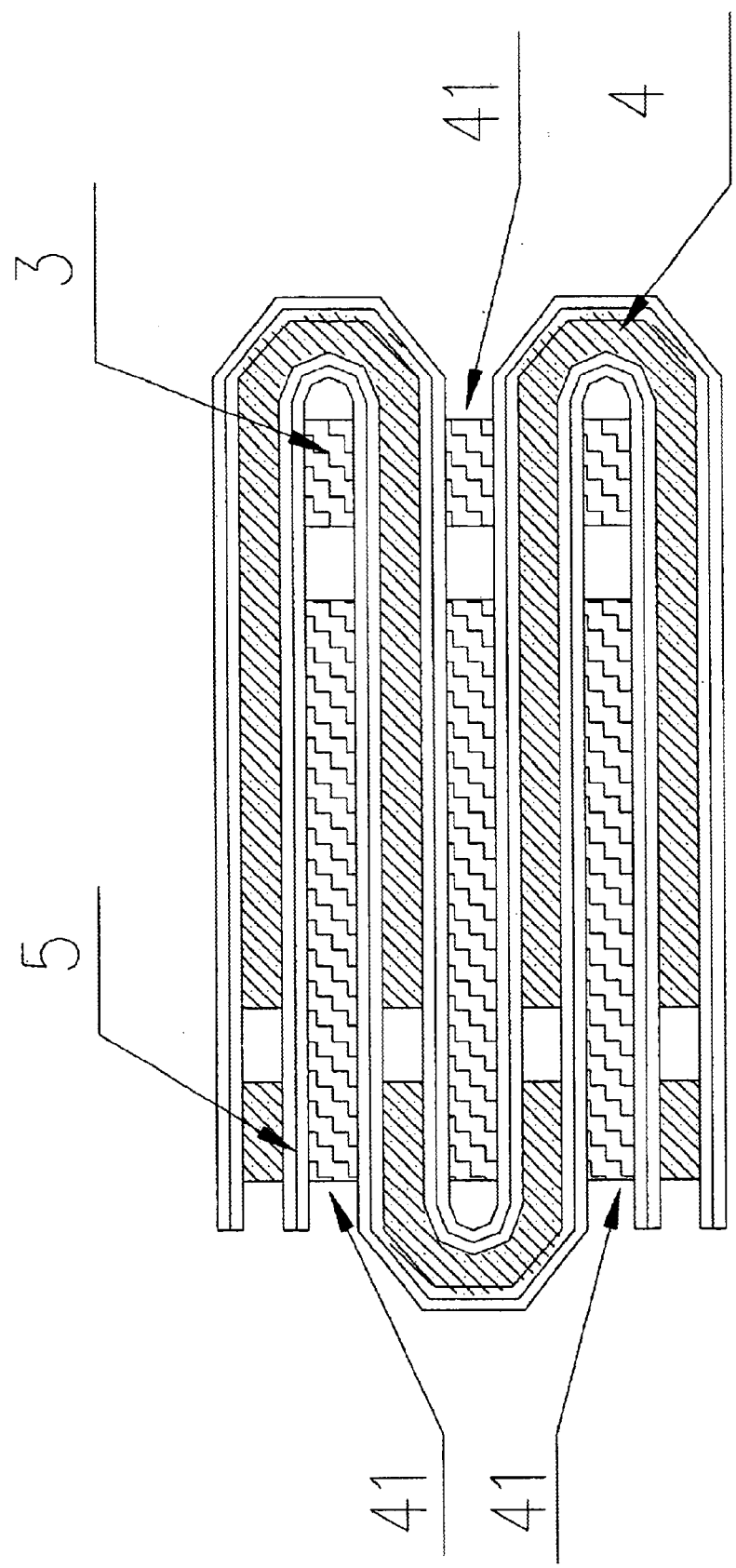
FIG. 4 is a schematic diagram showing a configuration of S-shape continuous plate according to a preferred embodiment of the present invention.

In an embodiment, a plate with one of the polarities is folded into continuous S-shape along with a separator integrally, its laminated area is inserted another plate with the other polarity. As shown in FIG. 4, a negative plate 4 is folded into continuous S-shape, a positive plate 3 being a single plate is inserted into the laminated area 41 of the plate 4. A separator 5 is provided between the positive plate 3 and the negative plate 4.

Figure 2:
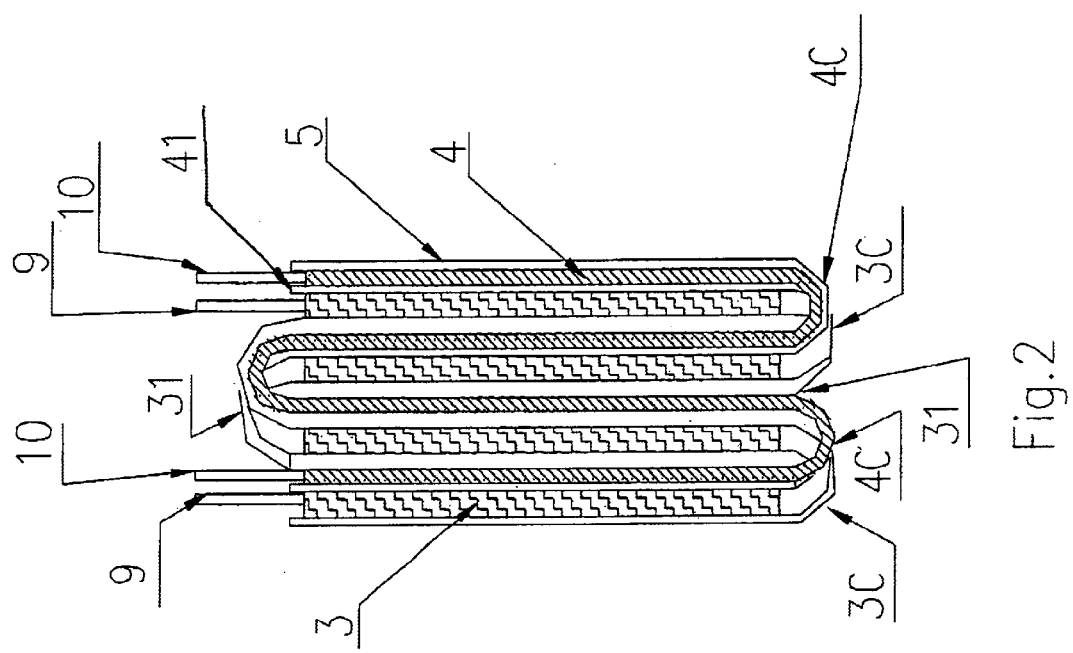
FIG. 2 is a schematic diagram showing a configuration of S-shape continuous folding plate having dual lugs according to a preferred embodiment of the present invention.
Figure 11:
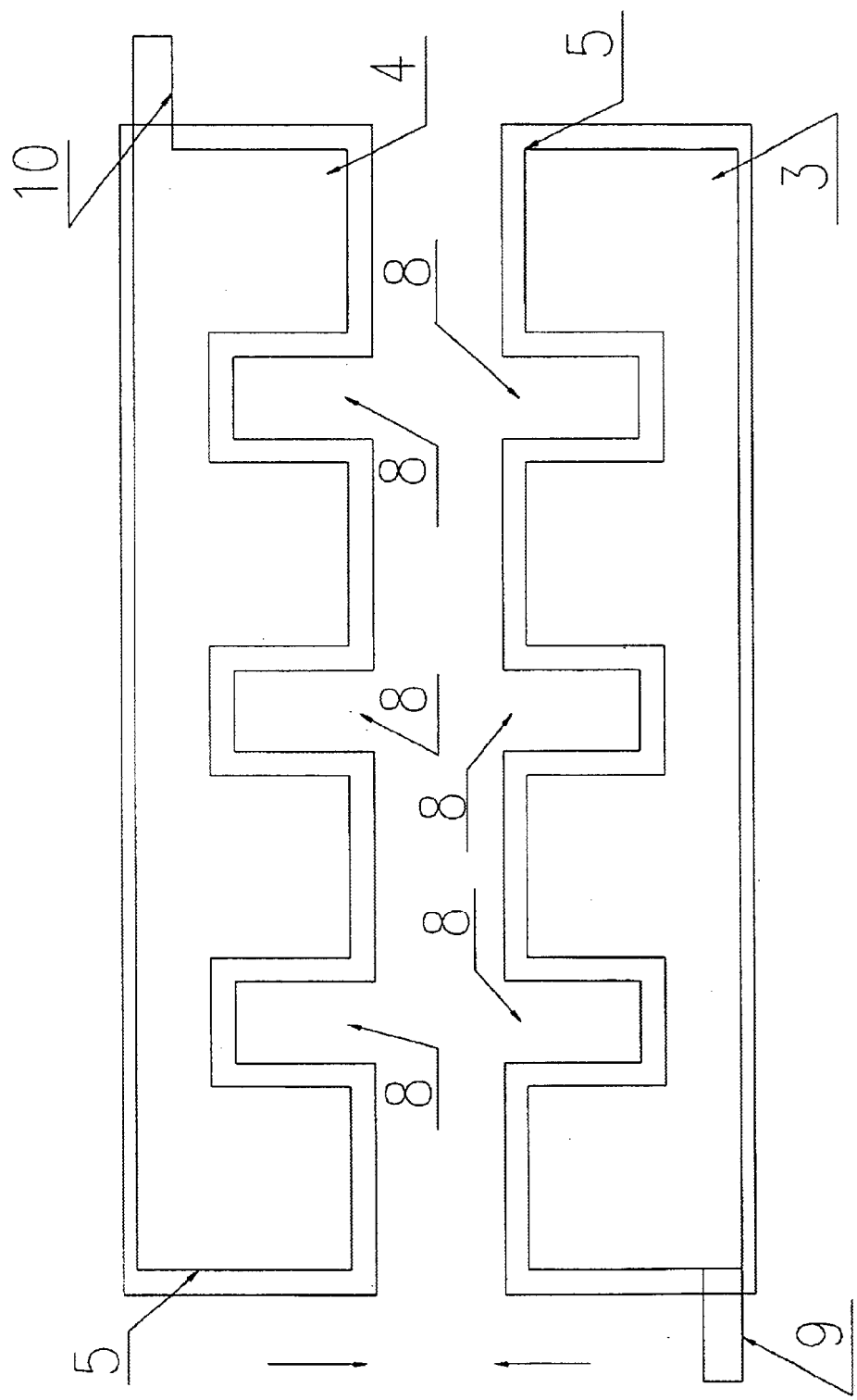
FIG. 11 is a schematic diagram showing a form of the plate of S-shape continuous folding plate having a single lug according to a preferred embodiment of the present invention.
Figure 12:
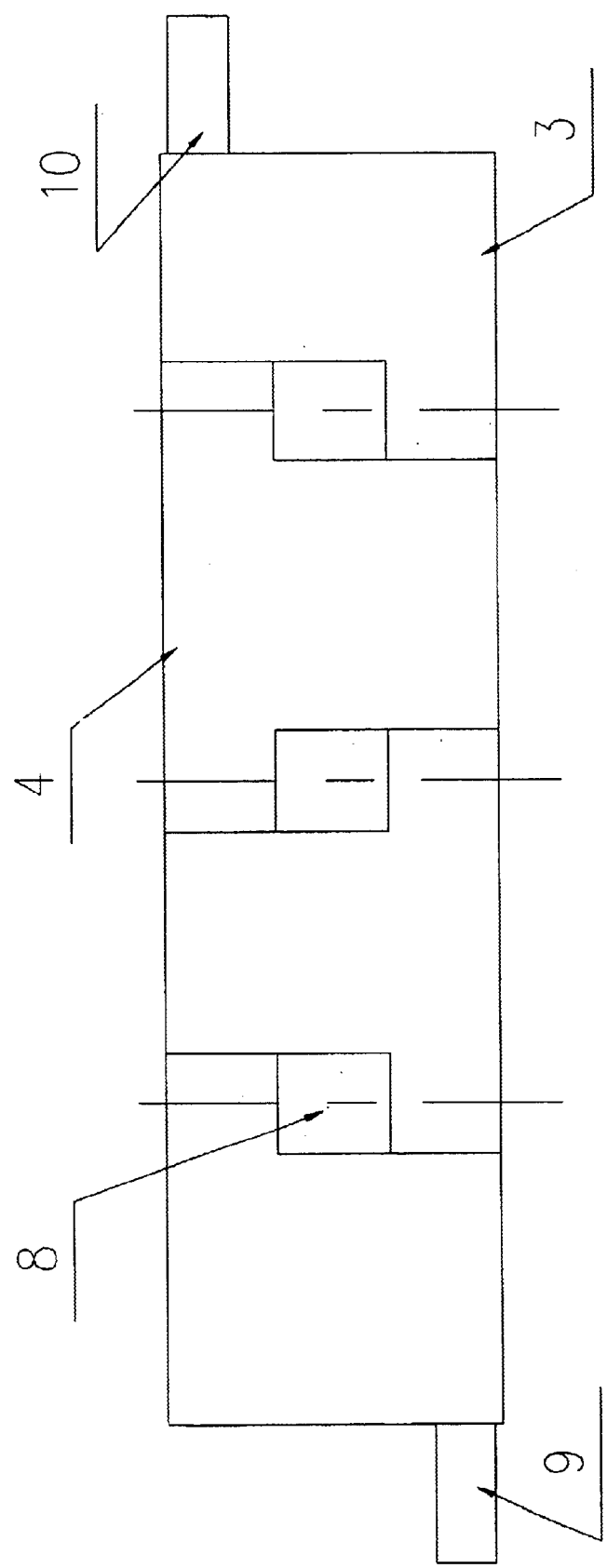
FIG. 12 is a schematic diagram showing the plate shown in FIG. 11 being arranged alternatively.
Figure 13:
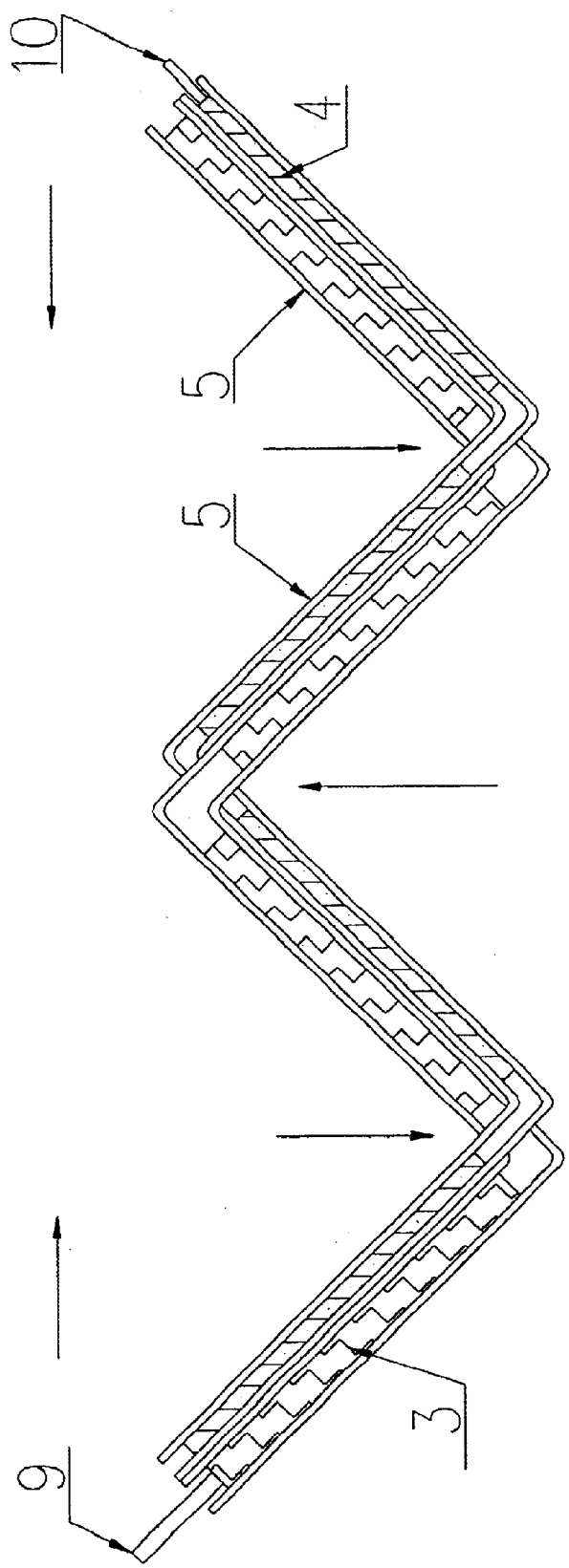
FIG. 13 is a schematic diagram showing the folding direction of the plate shown in FIG. 12 being arranged alternatively.

Further, another configuration can also be employed. Assembling of plate having single lug is shown in FIGS. 11, 12 and 13. The plates with opposite polarities respectively are S-shape continuous folded plates, notches 8 are provided at the cross-positions of the two plates. The two plates, shown in FIG. 11, covered with the separator are inserted upward and downward alternatively into each other and formed the structure as shown in FIG. 12. In these Figs, plates are indicated by dotted line, and separators are indicated by solid line. The positive and negative plate 3, 4 are folded by the arrow directions shown in FIG. 13. As shown in FIG. 2, the positive plate 3 is folded into continuous S-shape along with the separator 5 integrally, the negative plate 4 is also the same shape. Notches 8 (not shown) are provided at the cross-positions 3c, 4c of the two plates. Two plates with opposite polarities respectively are inserted in opposite direction, i.e. the negative plate 4 is overlapped on the laminated area 31 of the positive plate 3, and positive plate 3 is overlapped on the laminated area 41 of the negative plate 4. The assembling of plates having dual lugs, one more lug added on its plate, is the same. The plates having the same polarity can be in their entireties. In this case, the number of lugs can be reduced so as to connect with a post or terminal 2 directly, and make the connection reliably. The situation that the contact between single sheet of plates with the same polarity is poor can be improved. Hence, the resistance is decreased and the current discharge performance is increased.

When the plates are continuous folded plates, a plate grid can be pasted in two manners as follow: 1. positive active material or negative active material is pasted on the plate grid; 2. in the case which the plate grid is continuous S-shape, the plate grid is divided into two halves at the notch 8 where is in the middle of the plate grid, two sorts of active material can be pasted on the plate grid. One half is pasted with positive active material and the other half is pasted with negative active material. The efficiency can be increased. After pasting and hardening, a cured plate can be obtained.

Figure 3:
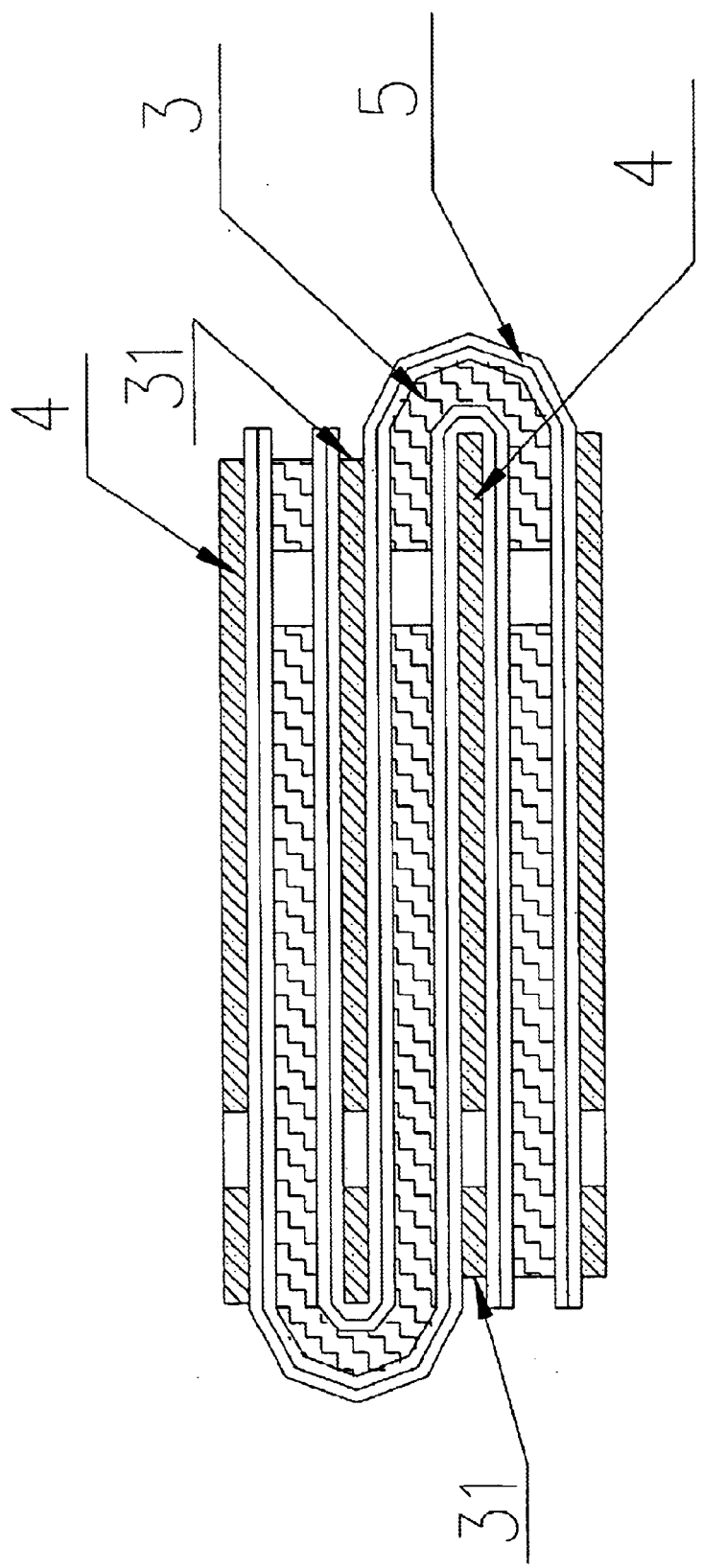
FIG. 3 is a schematic diagram showing one of the configurations of S-shape plate according to a preferred embodiment of the present invention.

In another embodiment, a plate with one of the polarities is folded into U-shape or S-shape along with a separator integrally. A plate with the other polarity is inserted into the laminated area of the plate. As shown in FIG. 3, the positive plate 3 is folded into S-shape along with the separator 5 integrally. As shown in FIG. 6, the positive plate 3 is folded into U-shape along with the separator 5 integrally, the negative plate 4 has the same shape as that of the positive plate 3. The negative plate 4 is a folding plate, and is folded into U-shape along with the separator 5 integrally, as shown in FIG. 7. In this case, since the plate and the separator are folded integrally, the efficiency of assembling can be increased, and decreases the assembling errors.

Figure 14:
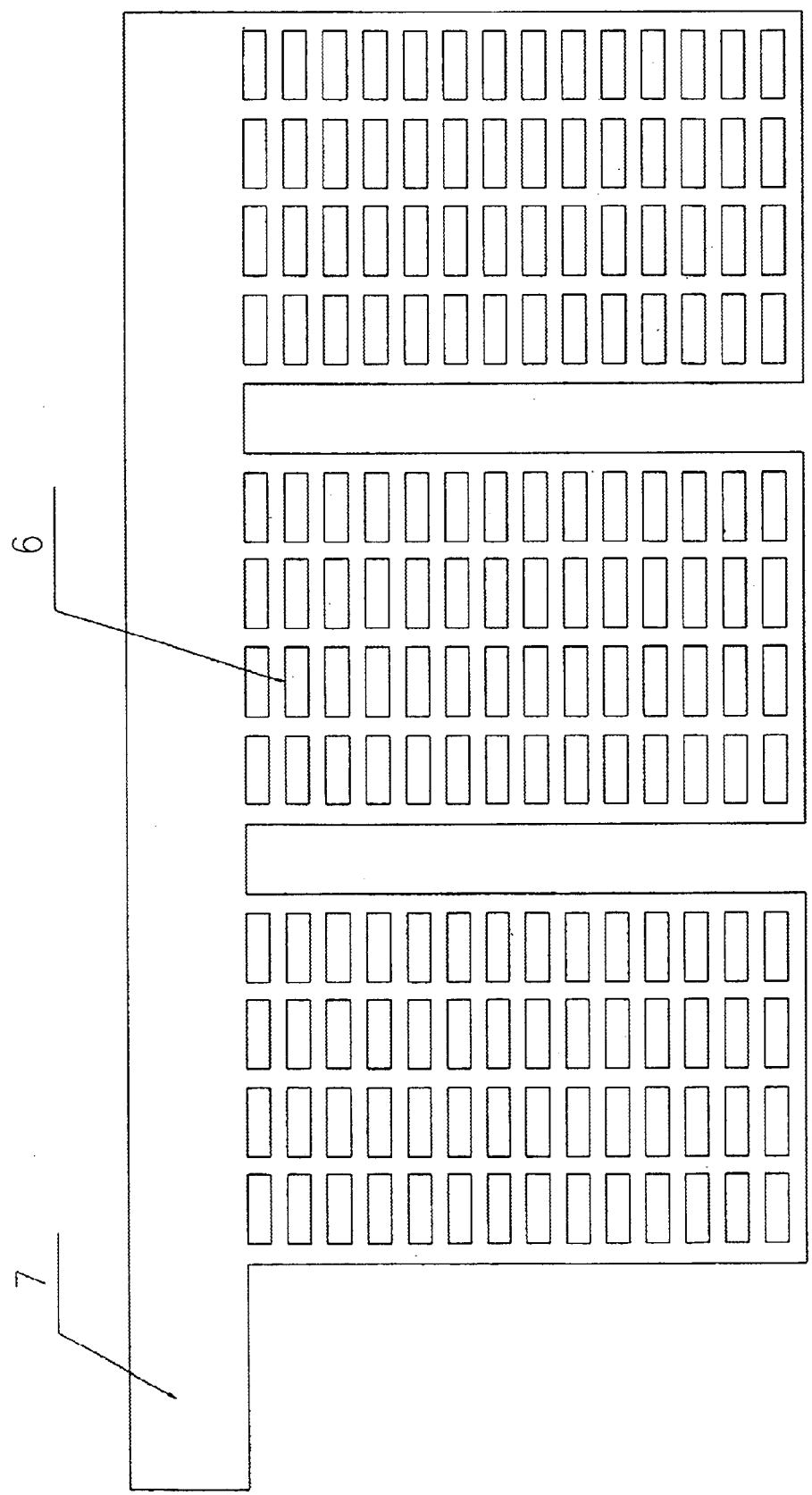
FIG. 14 is a schematic diagram showing a punching pattern of the plate grid according to a preferred embodiment of this invention.
Figure 15:
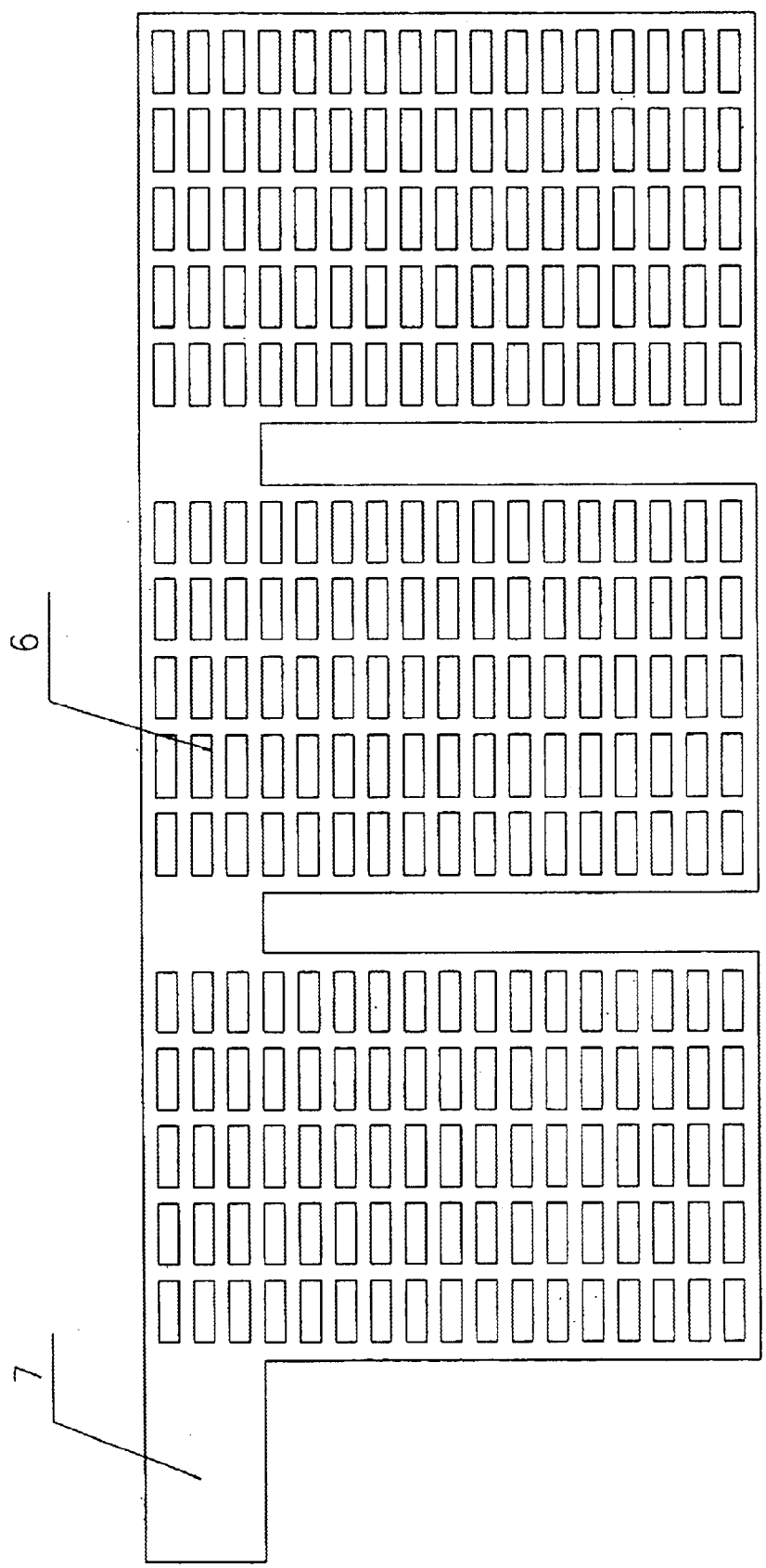
FIG. 15 is a schematic diagram showing another punching pattern of the plate grid according to a preferred embodiment of this invention.
Figure 16:
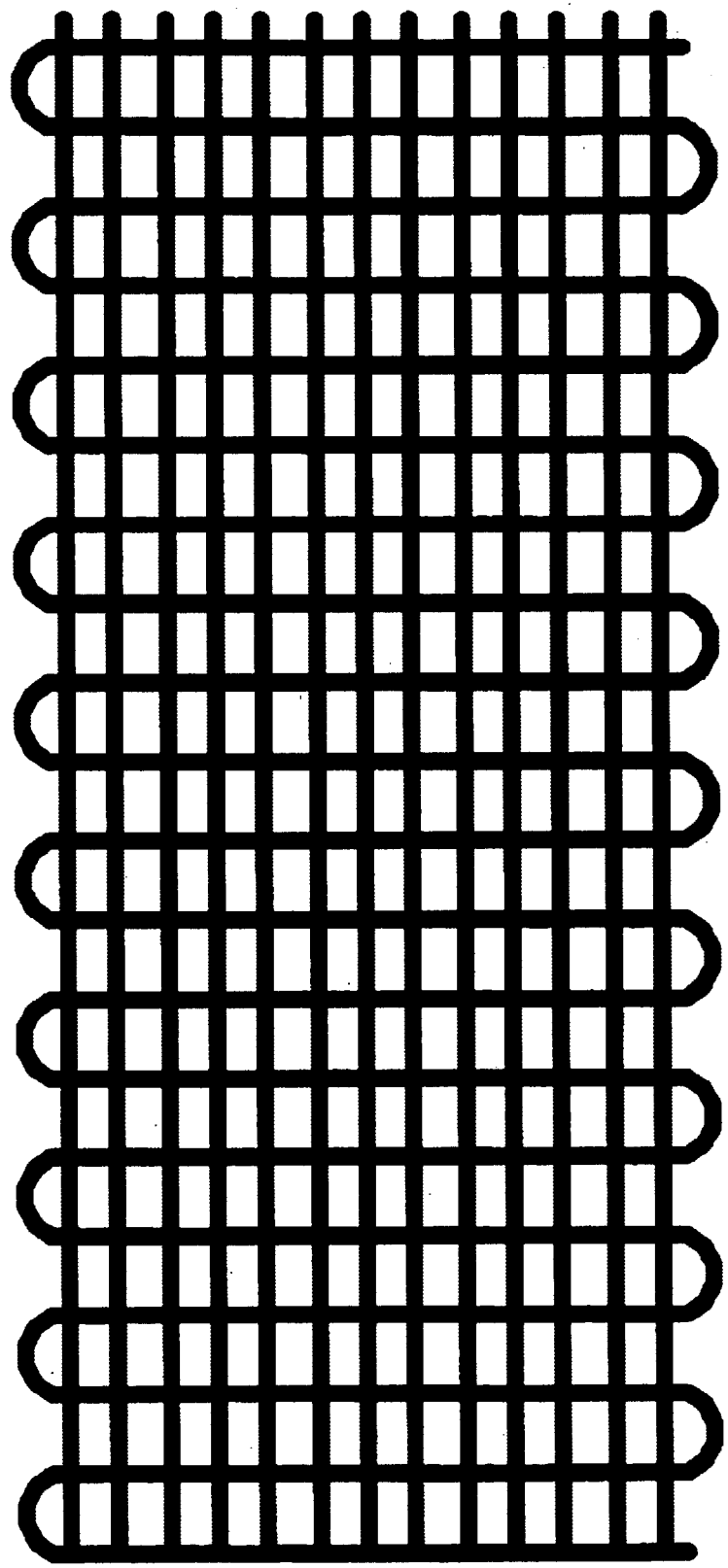
FIG. 16 is a schematic diagram showing a weaving plate grid according a preferred embodiment of this invention.
Figure 17:
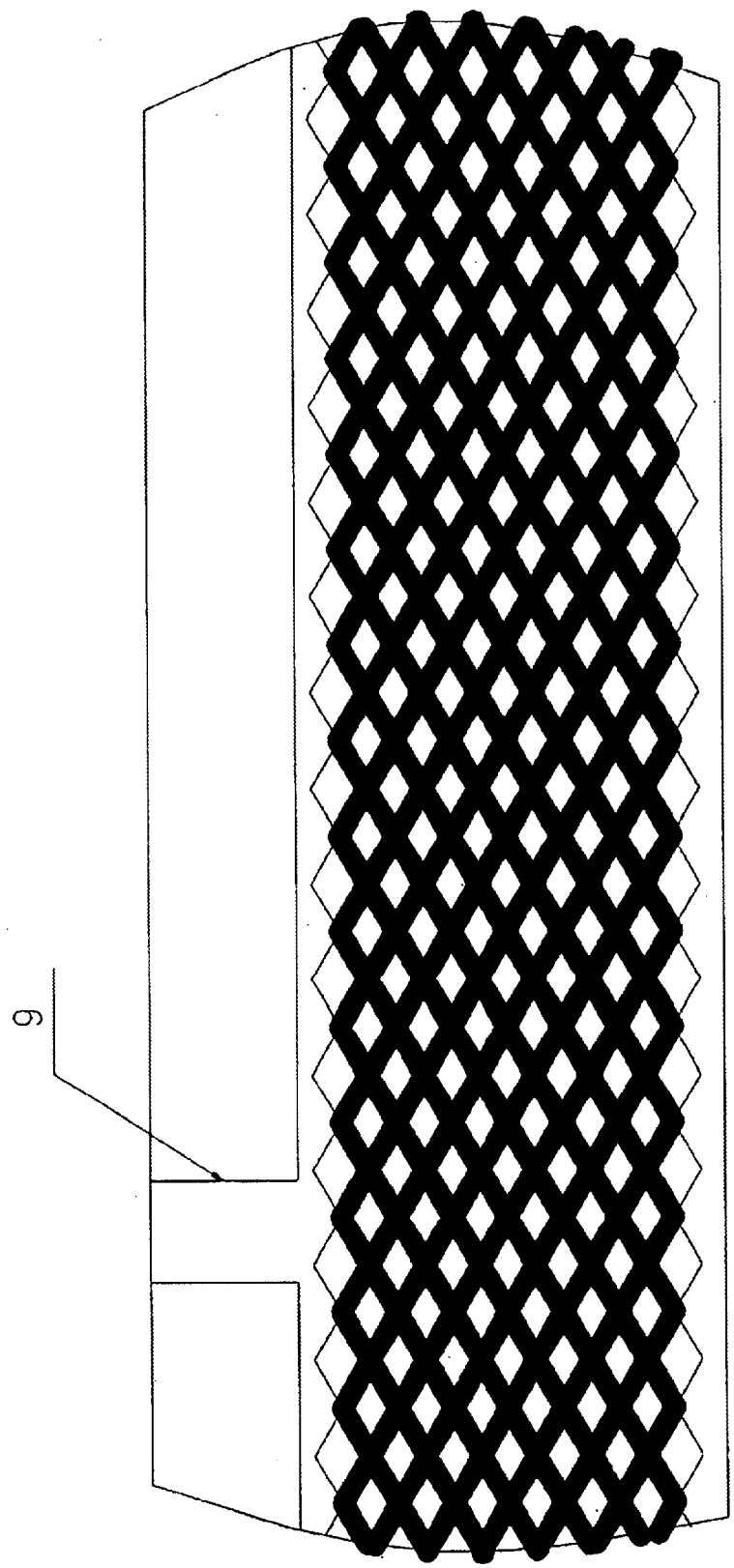
FIG. 17 is a schematic diagram showing an expanded plate grid according to a preferred embodiment of this invention.

The plate grid of the battery element group is made of grid material and produced in a manner of punching, expanding or weaving. The element group is then cut into the desired length and width according to the size of the element group. These procedures can be carried out in mechanization, and thereby increasing the efficiency of plate grid production. The plate grid material may be pure lead, lead-base alloy, iron-base alloy, copper-base alloy, or nickel-base alloy. The plate grid material is one of the forms of strip, wire, plate, foam, or net. FIG. 15 illustrates the distribution of punching holes 6 on the plate grid uniformly. FIG. 14 illustrates the distribution of holes 6 on the surface of the plate grid other than the area of connecting strip 7. FIG. 16 illustrates a woven plate grid made of strip or wire plate grid material and manufactured by weaving. FIG. 17 illustrates a expanded plate grid made of plate or strip plate grid material and manufactured by expanding.

FIG. 7 shows a battery, which includes a battery case 1, a post or terminal 2 of which one end is extended outside the case 1, the other end is positioned inside the case 1 and connected with bar of the element group, folded plates provided in space of the case, positive plate 3 and negative electrode plate 4 arranged alternatively, a plate with one of the polarities is inserted into a laminated area of a plate with the other polarity, a separator 5 is provided between the positive plate 3 and the negative plate 4. A plate with one of the polarities is folded into U-shape or S-shape along with the separator integrally, another plate with the other polarity is inserted in the laminated area of the plate. The plate with the other polarity is a single sheet of plate. In FIG. 7, the negative plate 4 is a folded plate. The negative plate 4 is folded into S-shape along with separator 5 integrally. The positive plate 3 is a single sheet of plate and is inserted in the laminated area 41 formed by folding negative plate 4 into U-shape along with the separator 5 integrally and positioned between two negative plates 4 which exhibit U-shape.

Figure 8:
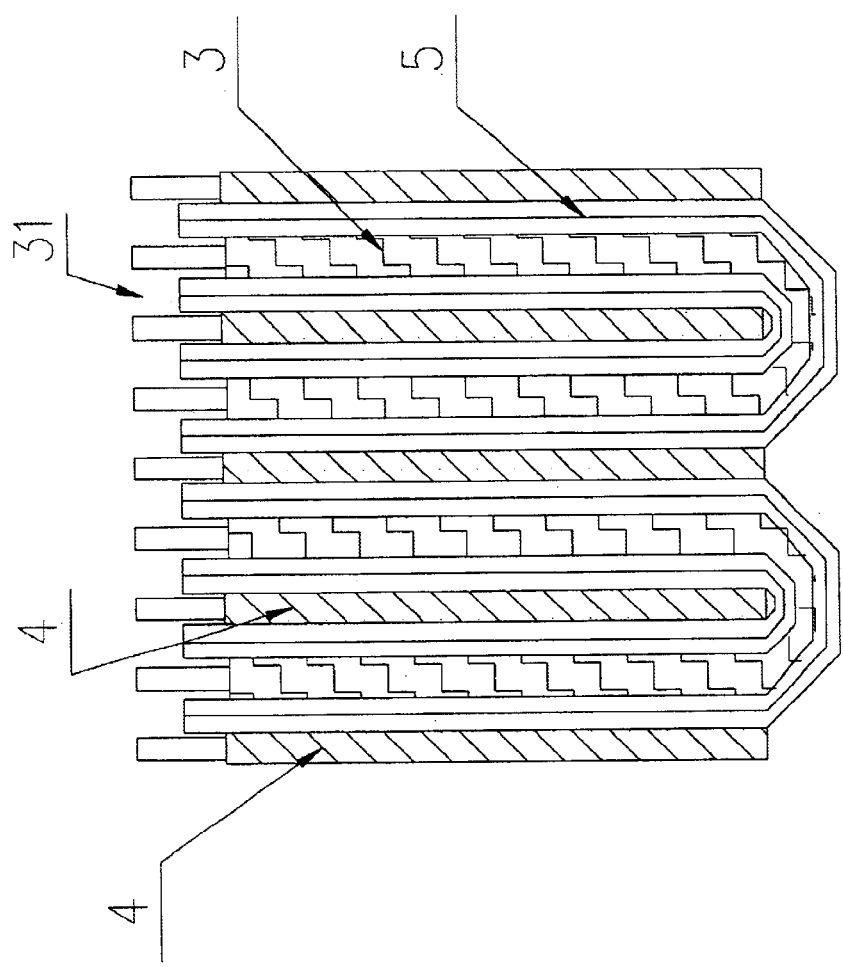
FIG. 8 is a schematic diagram showing still another configuration of U-shape plate according to a preferred embodiment of the present invention.

FIG. 8 shows another configuration of plates of the element group. The negative plate 4 is a single sheet of plate, while the positive plate 3 is a folded plate. The positive plate 3 is folded into U-shape along with the separator 5 integrally. There is provided a negative plate 4 on the laminated area 31 formed by the positive plate 3 and the separator 5. Further, a negative plate 4 is also provided between two positive plates 3 exhibiting folded U-shape. A separator 5 is provided between the positive and negative plates 3, 4.

Figure 9:
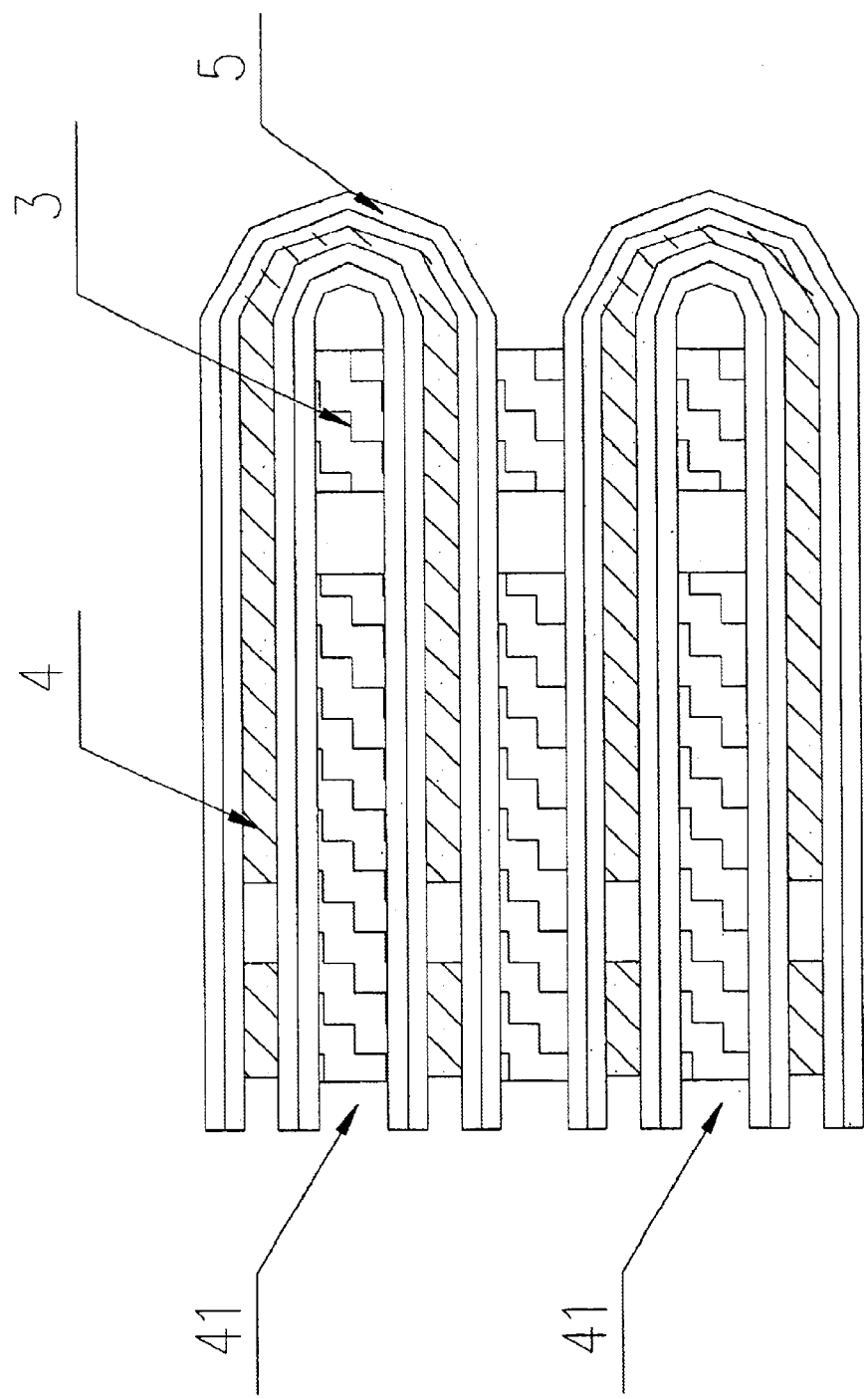
FIG. 9 is a schematic diagram showing further still another configuration of U-shape plate according to a preferred embodiment of the present invention.
Figure 10:
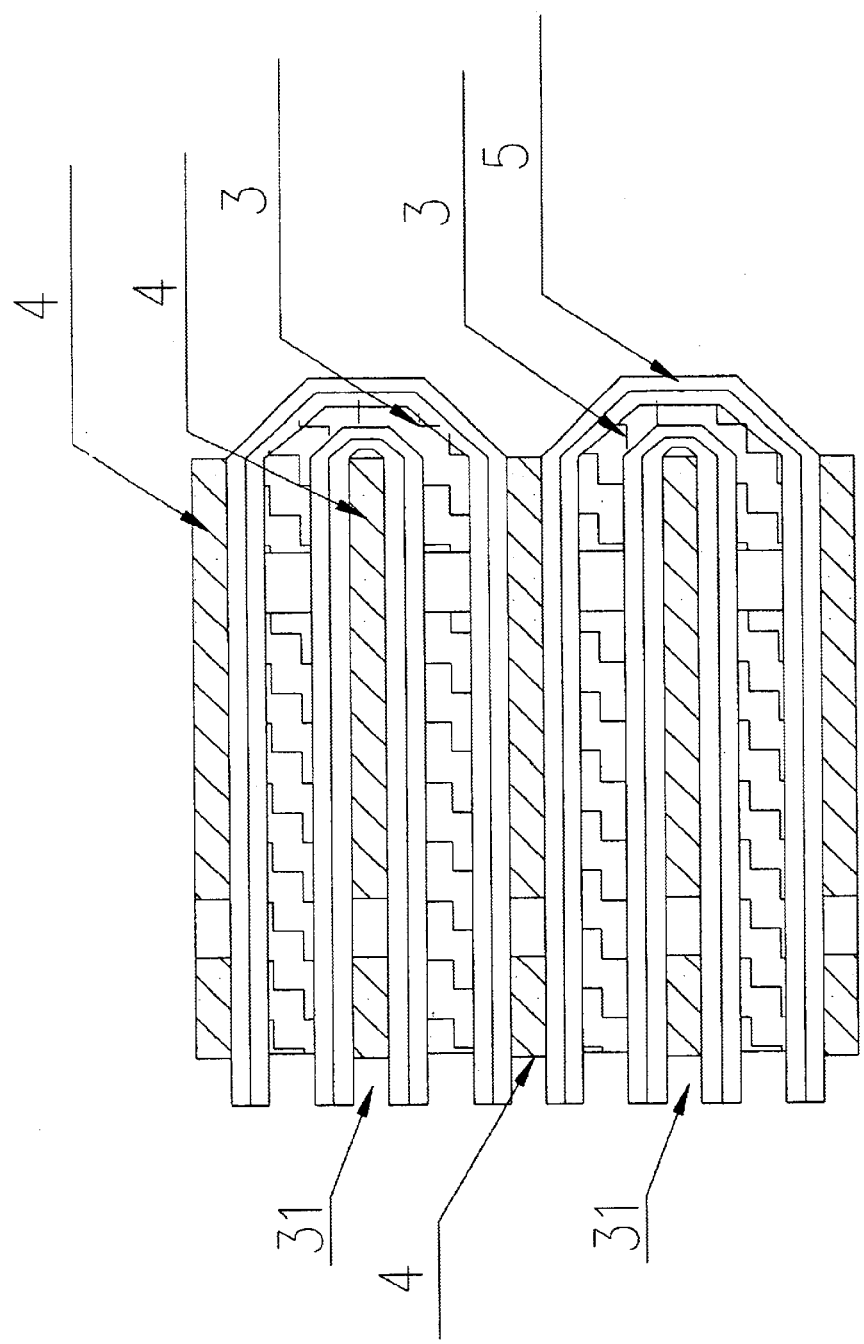
FIG. 10 is a schematic diagram showing another configuration of U-shape plate according to a preferred embodiment of the present invention.

FIG. 9 and FIG. 10 show other configurations of the plates. A plate is assembled in the battery case after being folded laterally. As shown in FIG. 9, the negative plate 4 is a folded plate and folded into U-shape along with the separator 5 integrally, while the positive plate 3 is a single sheet of plate and is provided in the laminated area 41 of the negative plate 4. As shown in FIG. 10, the positive plate 3 is a folded plate and folded into U-shape along with the separator 5 integrally, while the negative plate 4 is a single sheet of plate and is inserted in the laminated area 31 of the positive plate 3. The plate lugs may be at any position on the edge of the spread plane of the plates.

FIG. 6 shows another configuration of the plate according to the present invention. The plates with opposite polarities respectively are folded. In this Figure, the positive plate 3 and the negative plate 4 are folded into U-shape, and both of them are inserted into each other in opposite direction. The positive plate 3 is folded into U-shape along with the separator 5 integrally. The negative plate 4 has the same shape as that of the positive plate 3. One of the edge of the positive plate 3 is placed in the laminated area 41, while one of the edge of the negative plate 4 is placed in the laminated area 31. The separator 5 is provided between the positive plate 3 and the negative plate 4.

As shown in FIG. 3, the plate with one of the polarities is folded into S-shape along with the separator integrally, and the plate with the other polarity is inserted in the laminated area of that plate. The plate with the other polarity is a single sheet of plate. In this Figure, the positive plate 3 is folded into S-shape along with the separator 5 integrally, and the negative plate 4 being a single sheet of plate is inserted in the laminated area 31.

FIG. 4 shows another configuration of the plate. The negative plate 4 is folded into S-shape along with the separator 5 integrally, and the positive plate 3 being a single sheet of plate is inserted in the laminated area 41.

Figure 5:
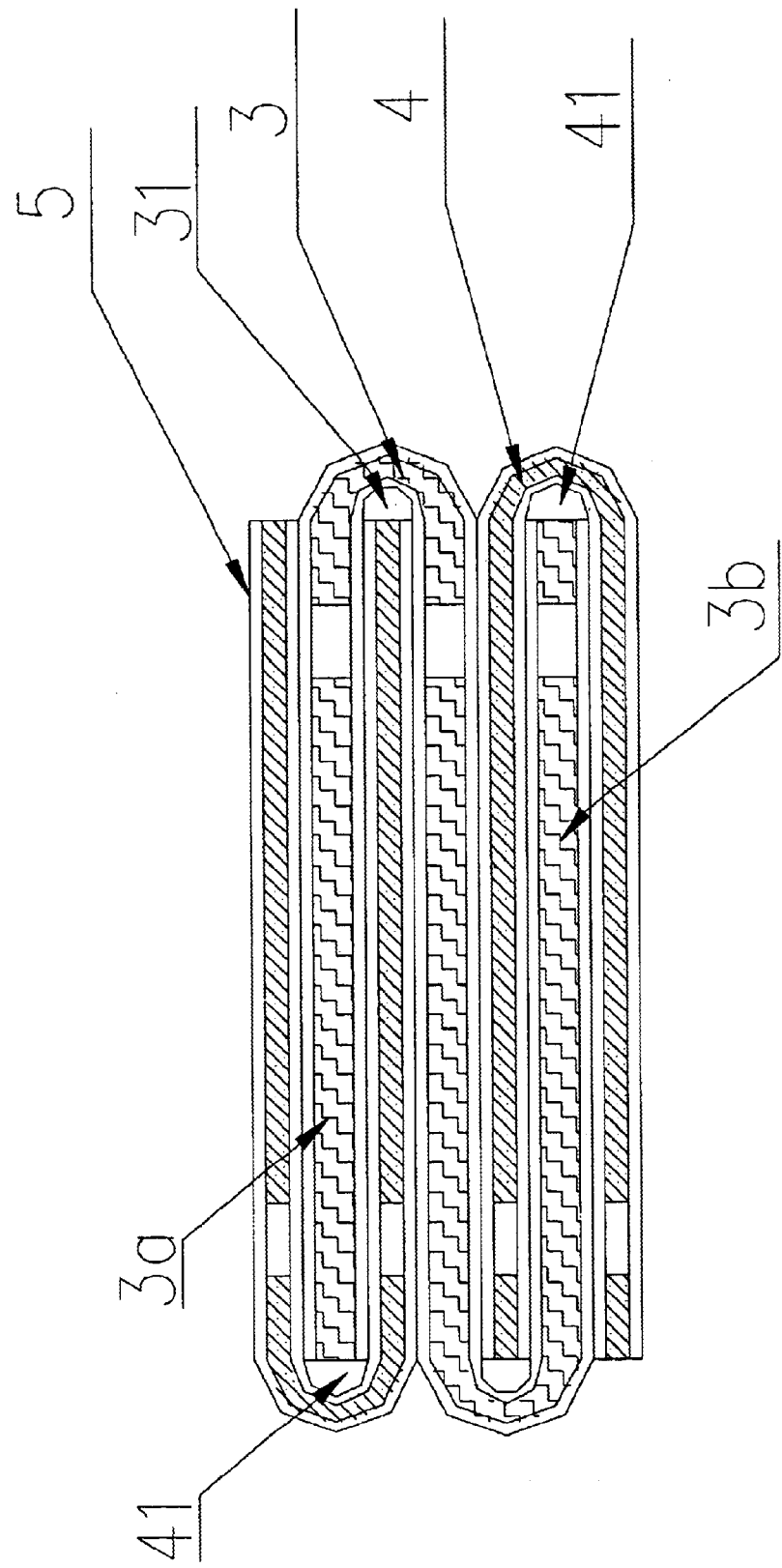
FIG. 5 is a schematic diagram showing another configuration of S-shape plate according to a preferred embodiment of the present invention.

In another configuration of the plates, the plates with opposite polarities respectively can be folded in S-shape, i.e. the positive plate 3 is also a folded plate, while the negative plate 4 is provided between two separators 5 and is folded into S-shape along with them. The positive and negative plates are inserted in each other with head and end alternatively. As shown in FIG. 5, positive plate 3 is provided between two separators 5 and is folded into S-shape along with them, while the negative plate 4 is a U-shape folded plate. The head and the end of the positive plate 3 are inserted in laminated area 41 of the negative plate 4 respectively.

As shown in FIG. 4, the plate with one of the polarities is folded into a continuous S-shape along with the separator 5 integrally, and there is provided a plate with the other polarity in the laminated area of that plate. The plate with the other polarity is a single sheet of plate. In this Fig., the negative plate 4 is folded into a continuous S-shape along with the separator 5 integrally, while the positive plate 3 being a single sheet of plate is inserted in the laminated area 41.

Figure 1:
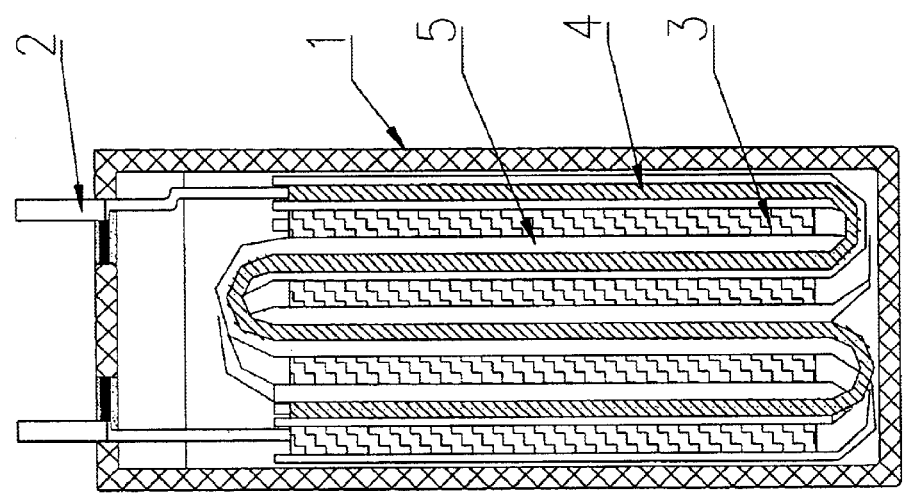
FIG. 1 is a schematic diagram showing a configuration of S-shape continuous folding plate having a single lug according to a preferred embodiment of the present invention

As shown in FIGS. 1 and 2, the plate with one of the polarities is folded into a continuous S-shape along with the separator integrally, and there is provided a plate with the other polarity in its laminated area. The plate with the other polarity is also a continuous folded plate. A notch 8 is provided at the cross-position (shown in FIGS. 11 and 12). FIG. 2 shows a plate with dual lugs, in this Fig., the positive plate 3 is folded into S-shape along with separator 5 integrally, and the negative plate 4 is also a folded plate, there are provided notches 8 (not shown) at the cross-positions 3*c*, 4*c* of the two plates. The two plates are inserted in each other in opposite direction, i.e. the negative plate 4 is inserted in the laminated area 31 of the positive plate 3, while the positive plate 3 is inserted in the laminated area 41 of the negative plate 4. There are provided two lugs on each of the plates. Reference numeral 9 indicates the lugs provided on positive plate 3, while reference numeral 10 indicates the lugs provided on negative plate 4. FIG. 1 depicts a plate with a single lug which has the same structure as that of plate shown in FIG. 2 except the number of the lug. FIG. 11 shows one of the shapes of the plate, which illustrates a single lug plate being covered by the separator 5. The positions of the lugs 9, 10 may be at left or right side of the plates, or above the plates, or be at any position on the edges of the spread plane of the plate.

The plates (plate grids) may be punched in such manners: holes 6 can be distributed on the whole surface of the plate grid, as shown in FIG. 15, it is also to distribute holes 6 uniformly on whole the surface of the plate grid according to the size of a battery as desired. Holes 6 in the plate grids can also be distributed in the surface of the plate below the connecting strip 7 of the plate grid. As shown in FIG. 14, Holes 6 in the plate grids are distributed on the surface of the plate grids other than connecting strip 7. The plates in their entireties are connected with the post or terminal 2 reliably, thereby decreasing the resistance and increasing high current discharge performance.

It is able to fold a plate along with a separator integrally, or to sandwich the plate between two separators and then fold them integrally. Folding the plate along with the separator integrally, it can increase the efficiency for assembling and decrease errors due to the installation of separators.

This invention can be used to make super-thin plate for assembling, suitable for the production of batteries for high current discharge.

What is claimed is:

1. A method for assembling a battery electrode groups comprising the steps of:

forming a positive plate grid having a plurality of notches;

forming a negative plate grid having a plurality of notches;

providing said positive plate grid and said negative plate grid with insulating separators respectively;

embedding said positive plate grid and said negative plate grid each other such that said plurality of notches of said positive plate grid are opposite to a plurality of protruding portions of said negative plate grid and said plurality of notches of said negative plate grid are opposite to a plurality of protruding portions of said positive plate grid respectively; and folding said positive plate and said negative plate along the middle lines between adjacent said protruding portions of said positive plate grid and said negative plate grid.

2. The method for assembling a battery electrode group according to claim 1 further comprising a step of folding said embedded positive plate grid and negative plate grid into a continuous S-shape.

3. The method for assembling a battery electrode group according to claim 1 further comprising a step of pasting positive active material or negative active material on said positive plate grid and said negative plate grid.

4. The method for assembling a battery electrode group according to claim 1 wherein said positive plate grid and said negative plate grid are divided into two sets of halves at the middle of each of said plurality of notches of said positive plate grid and said negative plate grid, one set of halves is pasted with positive active material and the other set of halves is pasted with negative active material.

5. The method for assembling a battery electrode group according to claim 1 wherein the plate grid material is made from pure lead, lead-base alloy, iron-base alloy, copper-base alloy or nickel-base alloy.

6. The method for assembling a battery electrode group according to claim 5 wherein the plate grid material is one of the forms of strip, wire, plate, foam, or net.

* * * * *

UNITED STATES PATENT AND TRADEMARK OFFICE
CERTIFICATE OF CORRECTION

PATENT NO. : 6,793,691 B2
DATED : September 21, 2004
INVENTOR(S) : Huanong Zhang It is certified that error appears in the above-identified patent and that said Letters Patent is hereby corrected as shown below:

Column 6,
Line 57, after the "assembling", delete "a".

Signed and Sealed this

Sixth Day of September, 2005

JON W. DUDAS
*Director of the United States Patent and Trademark Office*